April 1, 1958     H. A. MAY     2,829,014
TURBINE BEARING SUPPORT
Filed April 3, 1957
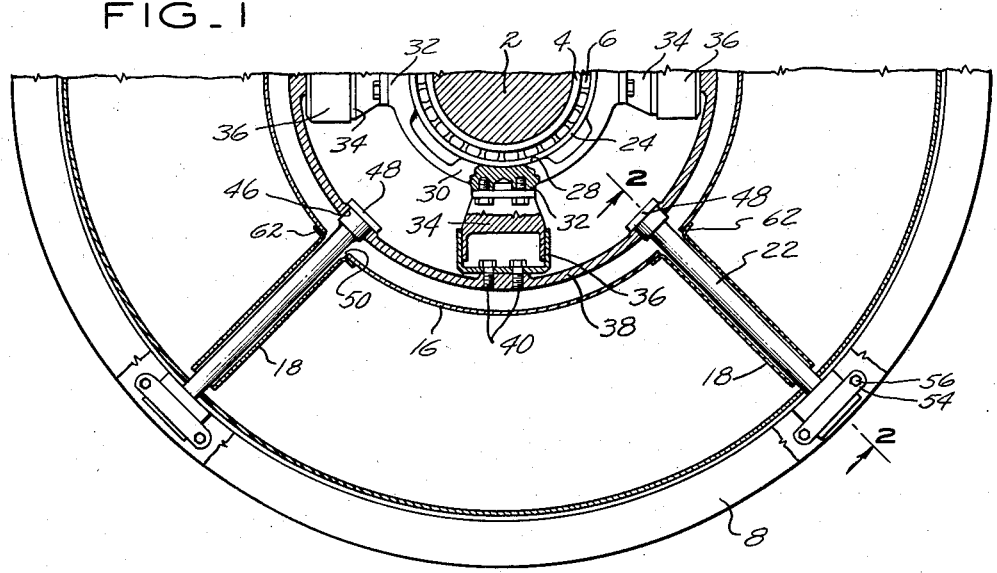
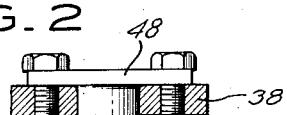
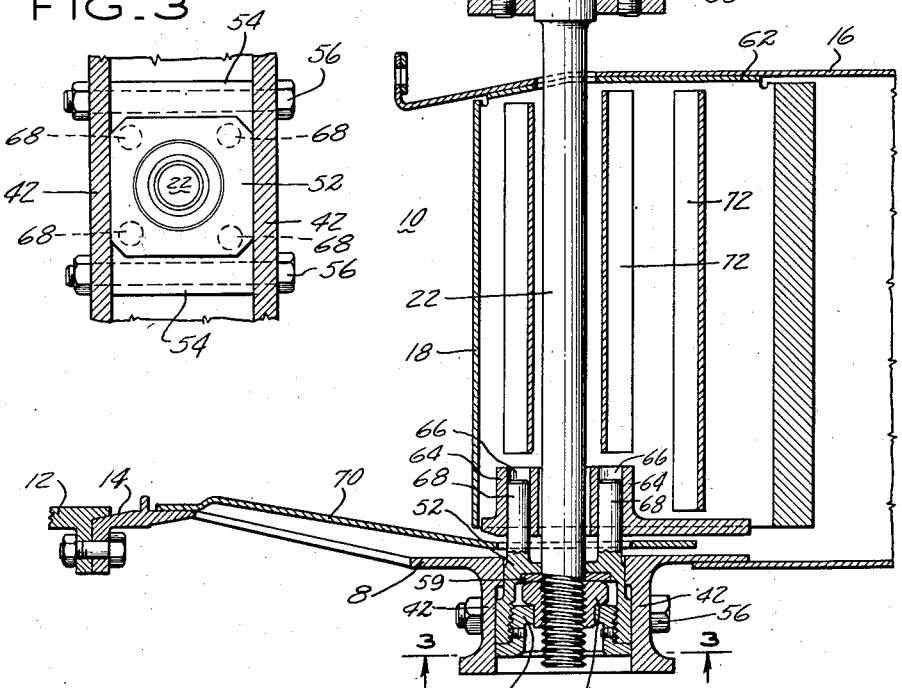
INVENTOR
HORACE A. MAY
BY Charles A. Warren
ATTORNEY

United States Patent Office 2,829,014
Patented Apr. 1, 1958

2,829,014

TURBINE BEARING SUPPORT

Horace A. May, Glastonbury, Conn., assignor to United Aircraft Corporation, East Hartford, Conn., a corporation of Delaware Application April 3, 1957, Serial No. 650,476

10 Claims. (Cl. 308—15)

This invention relates to a bearing support for use particularly in a jet engine and is more especially directed to the support for the bearing located downstream of the last turbine stage of the jet engine.

The exhaust gas from the turbine is discharged in the form of an annulus and the bearing for the turbine is supported within the annulus by supporting structures, such as rods or pins or the equivalent, which extend through the annulus of hot gas and provide a mounting which retains the bearing in concentric position with respect to the outer wall of the gas path, this outer wall being generally a part of the frame structure for the engine. One example of an engine of the type for which the present invention is adapted is disclosed in the Savin Patent No. 2,747,367. Because of the thermal expansion problems involved, it is difficult to provide a supporting structure which will maintain the bearing in concentricity with the casing or outer wall at all times. A feature of the present invention is an arrangement by which to support the bearing in position with a minimum of stress on the parts resulting from thermal expansion.

One tension support is shown in the co-pending application of Small and Haines application Serial No. 459,639, filed October 1, 1954, in which tension rods extend directly from the bearing-housing to the outer casing and any radial resilience is obtained from the outer casing. A feature of the present invention is the incorporation of a ring separate from the casing, and this ring provides the radial resilience by which to compensate for thermal changes in dimension.

Another feature of the invention is an arrangement by which to support the inner wall of the gas path in predetermined relation to the outer wall without imposing any additional loading on the housing for the bearing. Another object is to support the housing for the bearing by members which are loaded in tension but without transmitting excessive tensile stress into the main part of the housing or into the outer casing.

Other objects and advantages will be apparent from the specification and claims, and from the accompanying drawings which illustrate an embodiment of the invention.

Fig. 1 is a fragmentary transverse sectional view of the device.

Fig. 2 is a transverse sectional view of the parts of Fig. 1, substantially along line 2—2 of Fig. 1.

Fig. 3 is an axial sectional view substantially along the line 3—3 of Fig. 2.

With reference first to Figs. 1 and 2, the turbine shaft 2 carries thereon the inner race 4 of the bearing 6 which supports the shaft concentrically within the outer casing 8. This casing forms the outer wall of the annular duct 10 through which the exhaust gas from the turbine is discharged and is supported concentrically with the turbine casing 12 as by a piloting flange 14. The bearing is located downstream of the turbine and may be used for example, in a gas turbine power plant of the type shown in the Savin Patent No. 2,747,367.

The inner wall 16 of the duct 10 is a substantially cylindrical sleeve supported in spaced relation to the outer wall 8 by radially extending vanes 18 spaced about 90° apart and positioned around the bearing support rods 22 to be described in greater detail.

The outer race 24 of bearing 6 is supported within the central bore 28 of the bearing housing 30. This housing has mounting pads 32 on its periphery, these pads being preferably spaced 90° apart and having their mounting surfaces facing radially outward from the axis of the housing.

Each mounting pad 32 has bolted thereto the piston or plunger 34 of a dashpot device, each of these pistons having its axis radial and each piston being received in a cylinder or cup 36 mounted on and projecting radially inward from a spring ring 38 concentric to and surrounding the housing. These dashpot devices keep the housing concentrically within the ring but permit relative thermal expansion by the sliding of the pistons in the associated cylinders. The cylinders 36 are suitably fashened to the spring ring as by bolts 40.

The spring ring is supported within and concentrically of the casing 8 by the tension rods 22 which extend outwardly from the spring ring and are received between projecting flanges 42 on the outer side of the casing 8. The inner end of each rod 22 extends through an opening 46 in the spring ring and has a flange 48 on its inner end by which the rod is attached to the ring. The rod extends through an opening 50 in the inner duct wall 16, which has clearance around the rod, and through a vane 18, with the outer end received in a mounting cup 52 positioned between the flanges 42. As shown in Fig. 3, this cup has projecting lugs 54 on opposite sides to receive supporting bolts 56 extending through the flanges 42 and the lugs.

In attaching the rods 22 at their outer ends, each rod is threaded to receive a threaded ring 58 which engages a washer 59 in the bottom of the cup as shown. A locking ring 60 engaging threads on the inner wall of the cup engages ring 58 and locks it in position after each rod has been tensioned to the desired extent by tightening ring 58. By tensioning of the several rods the bearing housing and the spring ring 38 may be positioned concentrically within the casing 8 and the appropriate tension applied to retain concentrically and support the loads on the bearing.

The vanes 18 form fairings around the rods 22. Each vane 18 has flanges 62 at its inner end, Fig. 2, which are attached as by welding to the inner wall 16 such that the inner wall may be supported by these vanes. The outer end of each vane has a head 64 fitting therein and having radially extending bores 66 to receive radially extending pins 68 on the cup 52. The head 64 and the vane itself are spaced radially from the outer casing 8 to provide clearance for thermal expansion. A heat shield 70 may be provided parallel to and spaced from casing 8 to reduce the operating temperature of the casing.

The vane 18, as shown in Fig. 1, is large enough to provide clearance around the tension bolt, and may have reinforcing ribs 72 incorporated therein to retain the vane shape. The cap or head 64 is preferably welded into the outer end of the vane and has a central opening which receives the bolt 22 but has a clearance so that no loads on the vane will be transmitted directly to the bolt.

It is to be understood that the invention is not limited to the specific embodiment herein illustrated and described, but may be used in other ways without departure from its spirit as defined by the following claims.

I claim:

1. In a turbine construction, an annular casing, a bearing housing positioned centrally within the casing and in spaced relation thereto, a ring surrounding said housing and also located concentrically to the casing and in spaced relation thereto, angularly spaced means supporting said housing from said ring, and angularly spaced rods supporting said ring from said casing, said rods being angularly spaced from said supporting means.

2. In a turbine construction, an annular casing, a bearing housing positioned centrally within the casing and in spaced relation thereto, a ring surrounding said housing and also located concentrically to the casing and in spaced relation thereto, angularly spaced means supporting said housing from said ring, and angularly spaced rods supporting said ring from said casing, said rods being angularly spaced from said supporting means, and means engaging with said rods for applying a tensile stress thereto.

3. In a turbine construction, an annular casing, a bearing housing positioned centrally within the casing and in spaced relation thereto, a ring surrounding said housing and also located concentrically to the casing and in spaced relation thereto, angularly spaced means supporting said housing from said ring, and angularly spaced rods extending outwardly from said ring to said casing and supporting said ring from said casing, said rods being angularly spaced from said supporting means.

4. In a turbine construction, an annular casing, a bearing housing positioned centrally within the casing and in spaced relation thereto, a ring surrounding said housing and also located concentrically to the casing and in spaced relation thereto, said ring being resilient, angularly spaced means supporting said housing from said ring, and angularly spaced rods supporting said ring from said casing, said rods being angularly spaced from said supporting means.

5. In a turbine construction, an annular casing, a bearing housing positioned centrally within the casing and in spaced relation thereto, a ring surrounding said housing and also located concentrically to the casing and in spaced relation thereto, angularly spaced means supporting said housing from said ring, said means being radially slidable to provide for expansion of the ring with respect to the housing, and angularly spaced rods supporting said ring from said casing, said rods being angularly spaced from said supporting means.

6. In a turbine construction, an annular casing, a bearing housing positioned centrally within the casing and in spaced relation thereto, a ring surrounding said housing and also located concentrically to the casing and in spaced relation thereto, angularly spaced means supporting said housing from said ring, said means including radially extending plungers on one of said ring or housing and radially extending cylinders on the other of said ring or housing in which said plungers are slidable, and angularly spaced rods supporting said ring from said casing, said rods being angularly spaced from said supporting means.

7. In a turbine construction, an annular casing, a bearing housing positioned centrally within the casing and in spaced relation thereto, a ring surrounding said housing and also located concentrically to the casing and in spaced relation thereto, angularly spaced means supporting said housing from said ring, and angularly spaced rods supporting said ring from said casing, said ring being resilient in a radial direction.

8. In a turbine construction, an annular casing, a bearing housing positioned centrally within the casing and in spaced relation thereto, a ring surrounding said housing and also located concentrically to the casing and in spaced relation thereto, angularly spaced means supporting said housing from said ring, and angularly spaced rods supporting said ring from said casing, said rods being angularly spaced from said supporting means, said casing having a heavy flange thereon closely adjacent to the connection with said rods for resisting radial deflection, said rods being under tension to hold the ring in position.

9. A bearing support for a turbine bearing including a bearing housing, a tension ring surrounding said bearing and to which said housing is connected at spaced points, an outer casing surrounding said ring and tension rods connecting said ring and said casing, said tension rods being attached to said ring at points angularly spaced from the attachment of the housing thereto.

10. A bearing support for a turbine bearing including a bearing housing, a tension ring surrounding said bearing and to which said housing is connected at spaced points, an outer casing surrounding said ring and tension rods connecting said ring and said casing, said tension rods being attached to said ring at points angularly spaced from the attachment of the housing thereto, the connections between the ring and housing being radially slidable.

References Cited in the file of this patent

UNITED STATES PATENTS

| 2,417,845 | Soderberg | Mar. 25, 1947 |
| 2,724,621 | Kenney | Nov. 22, 1955 |

FOREIGN PATENTS

| 712,783 | Great Britain | July 28, 1954 |